United States Patent [19]
Myers et al.

[11] Patent Number: 5,194,076
[45] Date of Patent: Mar. 16, 1993

[54] LOW PRESSURE DROP DRY SCRUBBER

[75] Inventors: Robert B. Myers, Copley; Dennis W. Johnson, Barberton; Gerald T. Amrhein, Louisville, all of Ohio

[73] Assignee: The Babcock & Wilcox Company, New Orleans, La.

[21] Appl. No.: 781,465

[22] Filed: Oct. 23, 1991

[51] Int. Cl.$^5$ .............................................. B01D 47/00
[52] U.S. Cl. ....................................... 55/220; 261/116
[58] Field of Search ................. 261/116; 55/73, 220; 159/4.01, 4.02

[56] References Cited
U.S. PATENT DOCUMENTS 4,013,504  3/1977  Morris ................................. 159/4.2
4,980,099 12/1990  Myers et al. .......................... 261/116

FOREIGN PATENT DOCUMENTS 2084896  4/1982  United Kingdom ................. 55/230

Primary Examiner—Bernard Nozick
Attorney, Agent, or Firm—Vytas R. Matas; Robert J. Edwards; Daniel S. Kalka

[57] ABSTRACT

A vertical, co-current dry scrubber comprises a housing having a waste gas inlet and a treated gas outlet. A plurality of airfoil mounted atomizers extend across the interior of the housing for discharging slurry into the gas stream for treatment of the gas. The use of airfoil mounted atomizers reduces pressure drop across the chamber.

3 Claims, 5 Drawing Sheets

LOW PRESSURE DROP DRY SCRUBBER

FIELD AND BACKGROUND OF THE INVENTION

The present invention relates in general to gas scrubbers, and in particular, to a new and useful method for removing sulfur oxides and other contaminants contained in flue gas formed during the combustion of fossil fuels (coal, oil, petroleum coke, etc.) and/or waste materials which are burned by electric power generating plants, refuse-to-energy plants and other industrial processes.

Prior art with respect to the removal of sulfur oxides and/or other contaminants from a hot combustion exhaust gas to comply with federal and state emissions requirements as known by the inventors include:

1. Utilizing fossil fuels low in sulfur content and/or other contaminants, the major disadvantage being increased fuel and freight costs as dictated by supply/demand and proximity to the end user respectively.

2. Reduction of the sulfur content and/or other contaminants in the fuel prior to combustion via mechanical and/or chemical processes, the major disadvantage being the cost effectiveness of the mechanical and/or chemical processing necessary to meet the levels of sulfur and/or contaminants reduction required.

3. Mixing of dry alkali material with the fuel prior to combustion or injection of pulverized alkali material directly into the hot combustion gases to remove sulfur oxides and/or other contaminants via adsorption (i.e. LIMB, and Coolside Technologies as demonstrated by the Babcock & Wilcox Company and others), the major disadvantage being low to moderate removal efficiencies, poor reagent utilization and increased particulate loadings in the flue gas which may necessitate the requirements for further flue gas conditioning (i.e., humidification or sulfur trioxide injection) when the injection process is conducted upstream of an electrostatic precipitator (ESP).

4. The wet chemical adsorption process (i.e., wet scrubbing) wherein the hot gas is typically washed in an up flow gas liquid contact device with an aqueous alkaline solution or slurry to remove sulfur oxides and/or other contaminants, the major disadvantages being the loss of liquid both to the atmosphere (i.e., due to saturation of the flue gas and mist carryover) and with sludge produced in the process, the economics associated with the materials of construction for the absorber module and all related auxiliary equipment downstream (i.e., primary/secondary dewatering and waste water treatment subsystems). Babcock & Wilcox is one of several manufacturers of wet scrubbers.

5. Spray drying chemical absorption (i.e., dry scrubbing) wherein an aqueous alkaline solution or slurry is finely atomized (i.e., via mechanical, dual fluid or rotary cup type atomizers) and sprayed into a hot flue gas to remove sulfur oxides and other contaminants, with the major disadvantages being moderate-high pressure drop across the spray dryer gas inlet distribution device and the limitation on spray down temperature (i.e., approach to flue gas saturation temperature) to maintain controlled operations.

The Babcock & Wilcox Company currently has two commercial horizontal co-current flow dry scrubber systems in operation at two electric power generating plants. Babcock & Wilcox is the only known manufacturer of horizontal co-current flow dry scrubber systems for the electric utility industry. There are several major manufacturers of vertical co-current downflow dry scrubbing systems for the electric utility industry.

FIG. 1 is a perspective view, with portions removed, of a known horizontal co-current flow dry scrubber system available from the Babcock & Wilcox Company. The dry scrubber comprises a housing 10 having an inlet 12 for hot flue gas and an outlet 14 for supplying the particulate containing gases to a particulate collector. Slurry is supplied through an inlet 16 to a plurality of atomizers 18 which also receive pressurized air through an air inlet 20. A plurality of gas diffusers 22 cooperate with the outlet end of the atomizers to help mix the incoming gas flow 24 with the slurry, in a spray adsorption region 26 of housing 10. Unused slurry is recycled through the system by a flush outlet 28.

FIG. 2 is a vertical sectional view of a known vertical co-current downflow dry scrubber. The vertical scrubber comprises a housing 30 with a roof mounted gas disperser 32 for mixing the flue gas with the slurry discharged from atomizer 33.

SUMMARY OF THE INVENTION

The present invention is a low pressure drop dry scrubber. The purpose of the invention is to advance existing dry scrubber technology by reducing the pressure losses across the inlet/gas flow distribution device while simultaneously improving gas/liquid contact by homogeneously dispersing the sorbent into the gas stream, resulting in increased sulfur oxide/other contaminant removal efficiencies, increased reagent utilizations and improved scrubber operations.

A preferred embodiment of the invention comprises a vertical co-current down flow dry scrubber module equipped with a single or multiple arrays of atomizers housed in airfoil lance assemblies of the type disclosed in U.S. Pat. No. 4,980,099. Hot flue gas enters the dry scrubber through the inlet section and is directed downwardly to the airfoil lance assemblies, which provide the most aerodynamically efficient shape possible to both uniformly distribute gas flow across the dry scrubber chamber by minimizing flow disturbances and to house a single or multiple array of atomizers and their associated supply piping.

The low pressure drop inlet section/airfoil lance assembly arrangement allows uniform distribution of the gas flow across the spray drying chamber, eliminating the need for the less efficient, high pressure drop diffuser of FIG. 1 and the roof gas dispersers currently used for prior art spray dryer inlet gas distribution as shown in FIG. 2.

Accordingly, an object of the present invention is to provide a dry scrubber having low pressure drop and being simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 3:
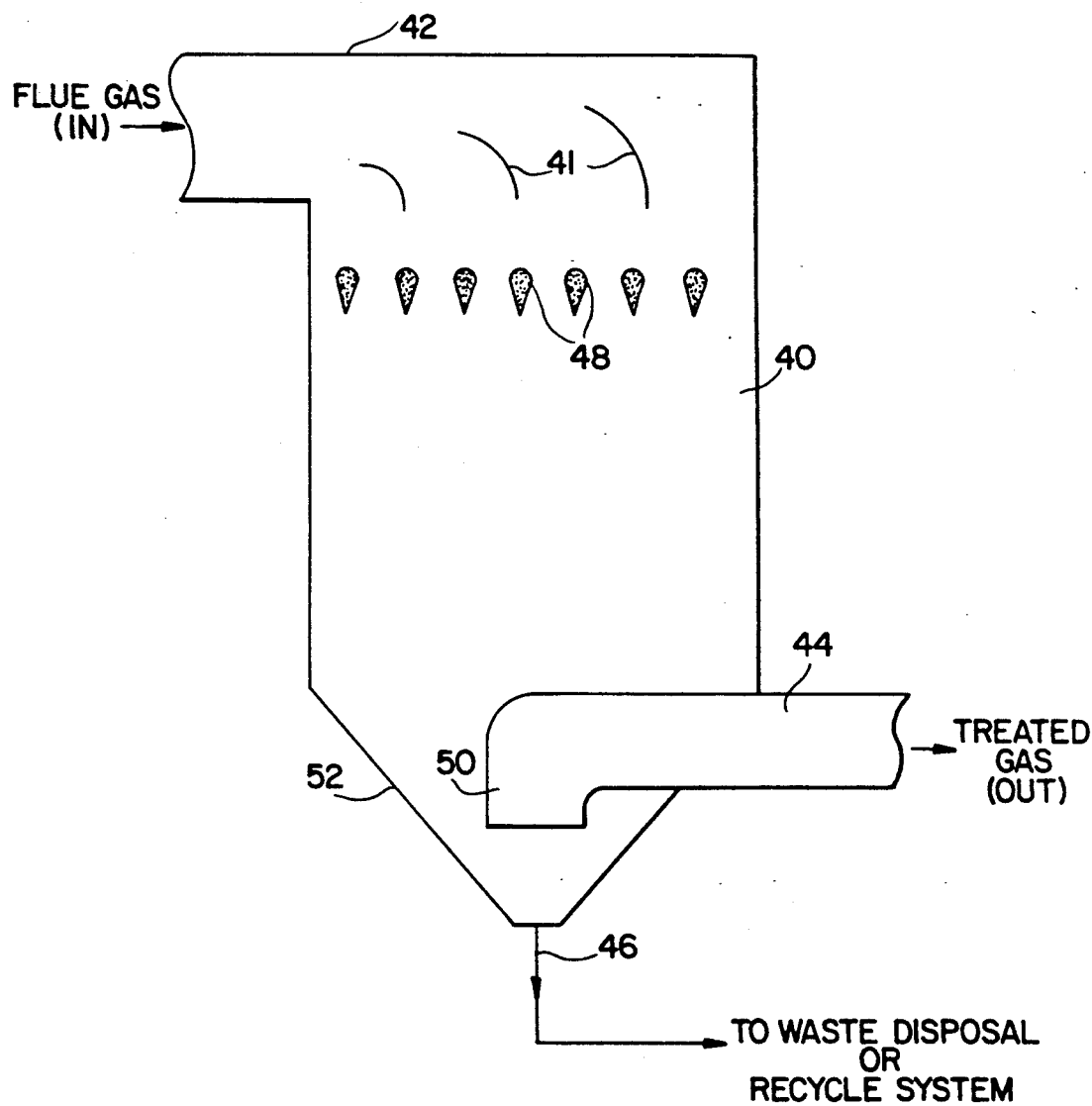
FIG. 3 is a vertical sectional view of a horizontal dry scrubber incorporating the present invention.

Referring to the drawings in particular, the invention embodied in FIG. 3 comprises a vertical dry scrubber having a housing 40 with an inlet 42 for flue gas which enters the chamber defined by the housing 40.

A single or multiple array of dual-fluid, airfoil mounted atomizers 48, spray a homogeneous distribution of a finely atomized alkali solution or slurry reagent into the hot flue gas stream to absorb sulfur oxides and/or other contaminants. Within seconds, the latent heat of the flue gas evaporates the liquid from the slurry droplets, which lowers the outlet gas temperature and produces a dry product. While FIG. 3 depicts the airfoil lances 48 in a planar arrangement, it should be understood that the airfoil lances may be directed in other directions such as toward a wall of housing 40 and do not have to be planar, i.e., can be staggered. A suitable alternate arrangement would have one or more airfoil lances 48 staggered vertically from the other lances.

The treated gas continues to travel downwardly past the atomizers, exiting the dry scrubbing chamber through outlet 44 and at a right angle with respect to the downward direction of flow. Some of the spray dried product collects in the hopper 52 located at the base of the housing and is subsequently discharged to an ash removal system through a waste outlet 46. For some embodiments, at least one diverting vane 41 or other air distribution device may be provided in the chamber between the inlet 42 and the airfoil lance assemblies to redirect and distribute the flue gas. Outlet 44 may have a downwardly facing inlet 50 from the chamber, or a radially connected inlet near the hopper 52 or connected in an appropriate manner that meets the low pressure drop and other goals of this invention.

Because the alkali solution or slurry reagent is homogeneously dispersed into the gas stream, lower spray down temperatures (i.e., lower approach to saturation) are achievable than with the prior art scrubber designs, which improves reagent utilization and the removal efficiencies of sulfur oxides and other contaminants.

Figure 1:
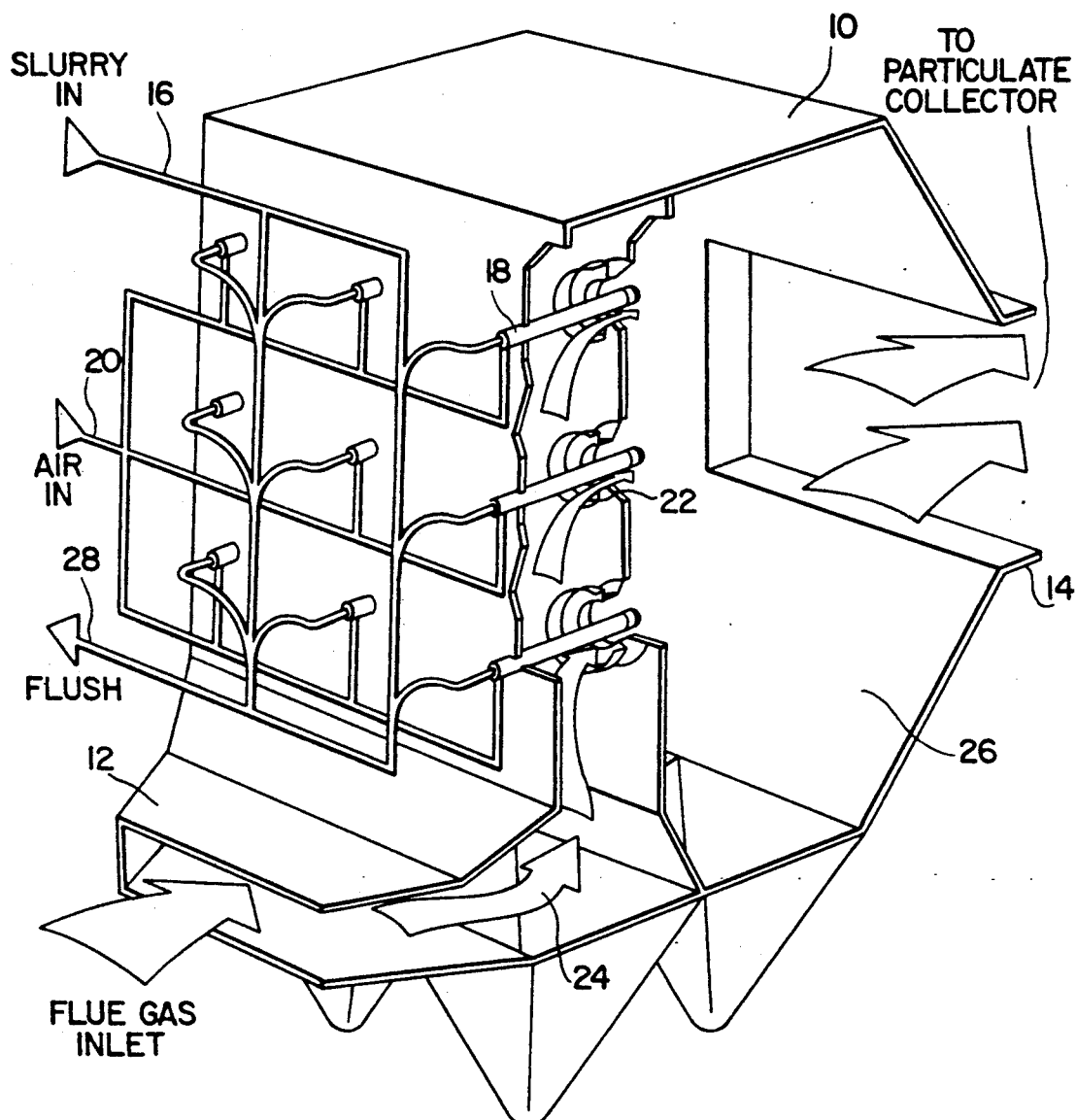
FIG. 1 is a perspective view with portions cut away of a known horizontal dry scrubber.
Figure 2:
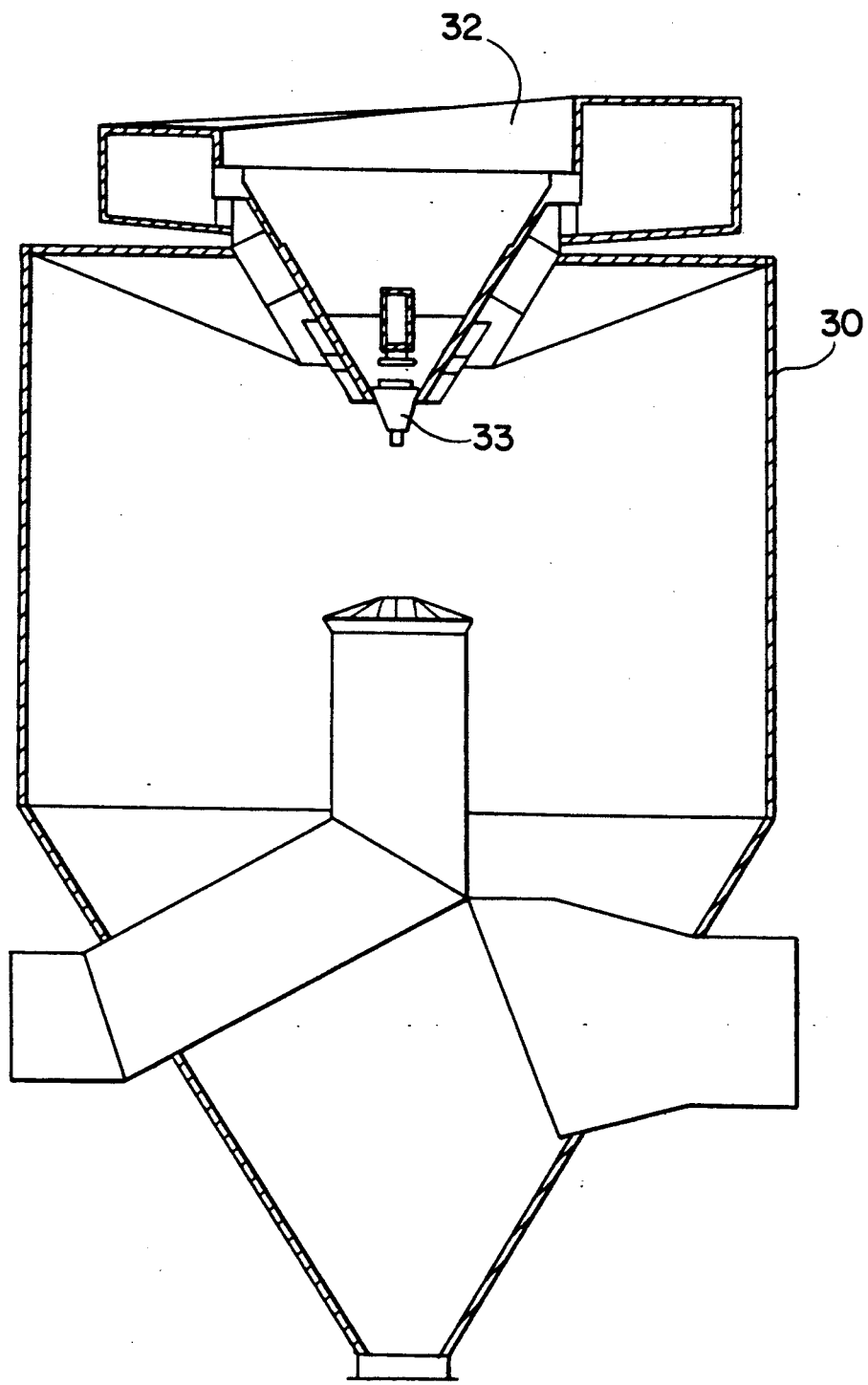
FIG. 2 is a vertical sectional view of a known vertical dry scrubber.
Figure 4:
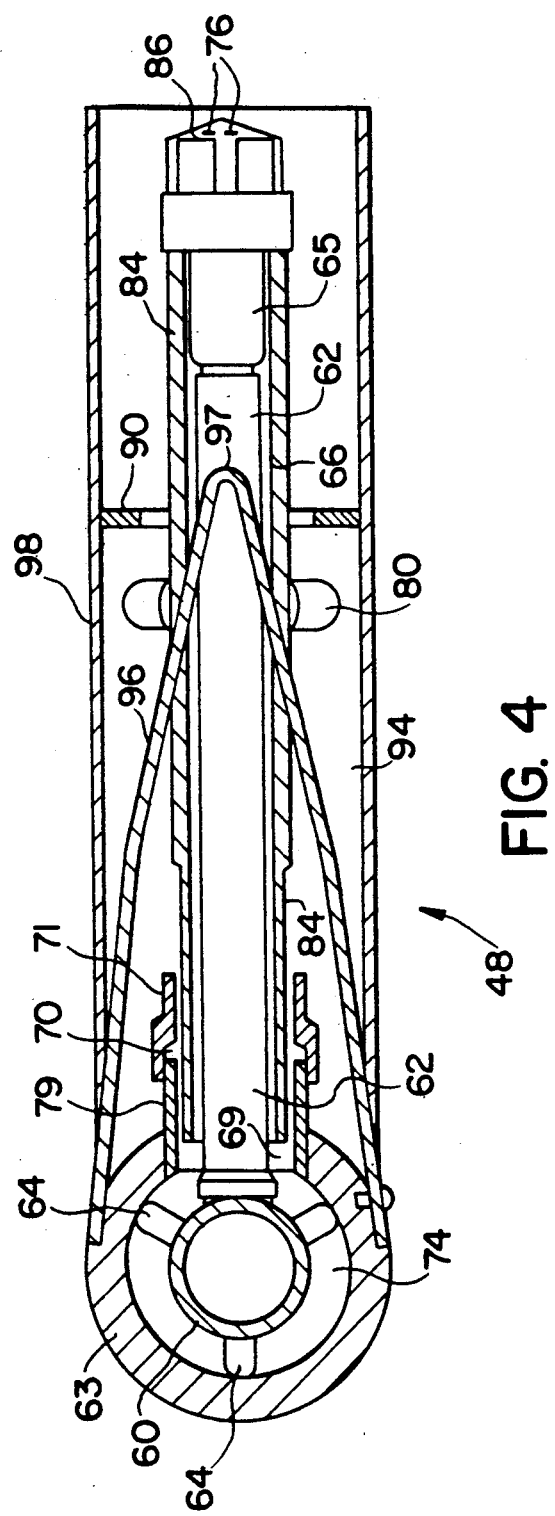
FIG. 4 is a sectional view taken along line 4—4 of FIG. 5, showing the construction of an airfoil lance apparatus used in accordance with the present invention and disclosed in U.S. Pat. No. 4,980,009.
Figure 5:
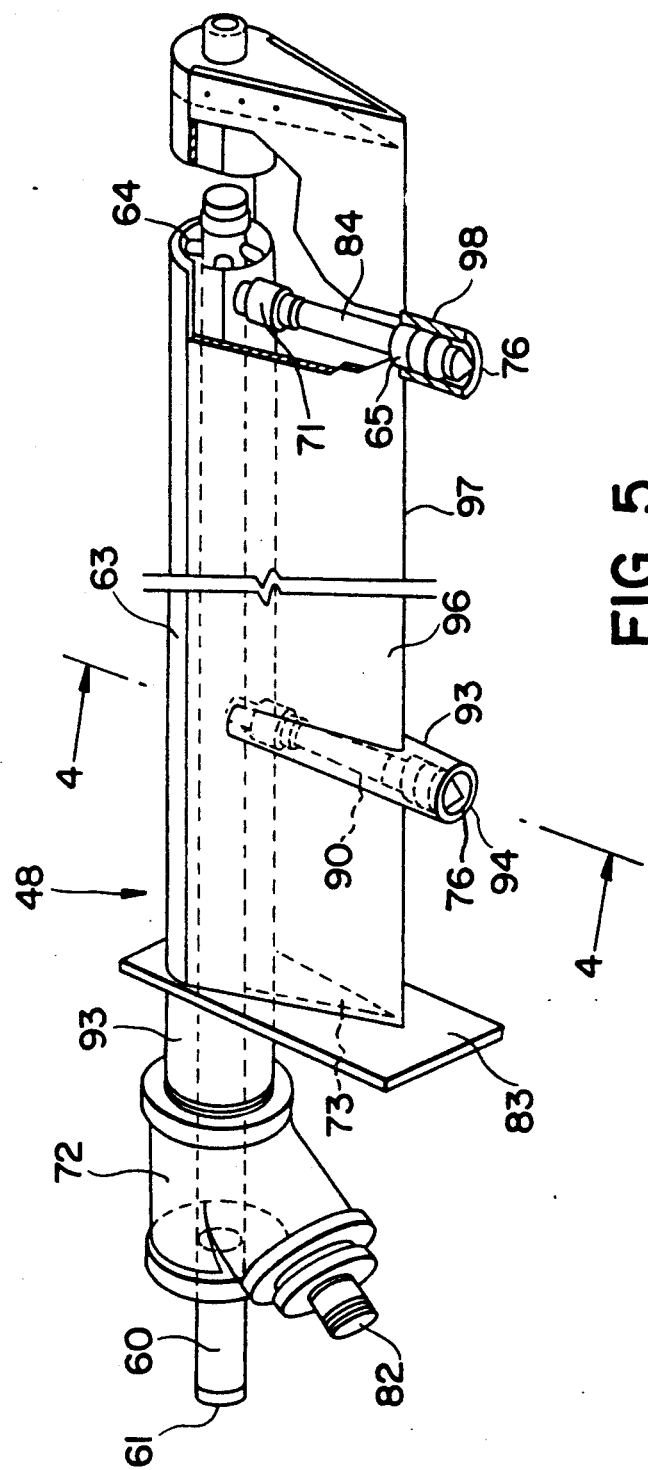
FIG. 5 is a partial perspective view of the airfoil lance with portions cut away.

FIGS. 4 and 5, which correspond to respective FIGS. 2 and 3 in U.S. Pat. No. 4,980,099 (which is incorporated here by reference), illustrates a representative atomizer array 48.

Water or sorbent to be atomized enters an inner header manifold 60, at a port 61. The inner header manifold 60 supplies the water or sorbent to an atomizer mix chamber 65, via an inner barrel 62.

The inner header manifold 60, is positioned by spacers 64 concentrically within an outer header manifold 63, which forms the leading edge of the airfoil lance apparatus. Atomizing gas enters a service supply lateral 72, through an atomizing gas inlet port 82, which directs the air to an annulus 74 formed between the inner header manifold 60 and the outer header manifold 63. The gas flows through this annulus and subsequent to the atomizer mix chamber 65, by entering, through an inlet port 69, an annulus 66 formed between the inner barrel 62, and an outer barrel 84 held by alignment spacers 80. The homogenized mixture of the gas, liquid and/or solids exit the atomizer mix chamber 65, and subsequently nozzle openings 76 of an atomizer end cap 86.

Outer barrel 84 is held to manifold 63 by a packing gland 79, an 0-ring 70 and a packing gland nut 71.

Atomizer shield gas enters though a shield gas port 73 in a mounting plate 83 and is ducted through the passageway bounded in part by the outer header manifold 63, and an airfoil skin 96 which is fixed to manifold 63. Subsequently the shield gas flows over the atomizer end cap 86, by entering an annulus 94 formed between the outer barrel 84 and a nacelle housing 98 extending from the trailing edge 97 of the airfoil skin 96. Uniform distribution of shield gas flow among the plurality of atomizers is accomplished through the use of a uniquely sized flow distributing orifice 90 fixed to the interior wall of each nacelle housing 98.

The advantages of the invention include:

1. Low gas side pressure drop across the vertical, co-current down flow dry scrubber due to the utilization of the airfoil lance concept to both aerodynamically house the atomizer and their associated supply piping and to straighten/distribute the bulk gas flow in the dry scrubbing chamber.

2. The ability to increase sulfur oxides and other contaminant removal efficiencies and reagent utilization by operating at lower outlet gas temperatures (i.e., lower approach to saturation).

3. Lower overall pressure drop, resulting in lower operating costs. The life-cycle cost for a 500–600 MW boiler FGD System is typically evaluated at $500,000 to $1,500,000 per inch (water gauge) of pressure drop. Pressure drop reductions of one (1) to two (2) inches (water gauge) or greater could be expected for an FGD System of this size.

4. The simplicity of the design result in lower capital cost by eliminating the complex gas distribution device such as diffuser or roof gas dispersers currently used in prior art dry scrubber designs.

5. The invention can better accommodate flue gas temperature stratification/flow imbalances by controlling the atomized alkali solution or slurry reagent flow to individual nozzles in the atomizer array. This control concept can be done automatically on line by measuring the gas flow and upstream or downstream temperature profile.

6. Use of more efficient, lower capacity nozzles resulting in improved atomization quality or the same atomization quality with less energy required as compared to conventional dry scrubbing atomizers.

7. No moving internal components.

8. Simple to operate.

The invention may also be incorporated into a horizontal dry scrubber arrangement of the type shown, for example, in U.S. Pat. No. 4,452,765.

While a specific embodiment of the invention has been shown and described in detail to illustrate the application of the principles of the invention, it will be understood that the invention may be embodied otherwise without departing from such principles.

What is claimed is:

1. A co-current dry scrubber for discharging a solution or slurry containing a gas treatment composition into waste gas, comprising:

a housing defining a chamber having a waste gas inlet for receiving waste gas and a treated gas outlet for discharging treated gas from the chamber, said chamber extending vertically with said waste gas inlet being above said treated gas outlet, said treated gas outlet having a conduit extending at an angle of about 90° to a major axis of the chamber and having a downwardly facing inlet for receiving gas plus dried slurry from the chamber; and at least one airfoil lance atomizer array extending across the chamber and in the housing, the array including an airfoil lance member having a large radius leading edge for facing oncoming gas entering through the waste gas inlet, and a small radius trailing edge facing oppositely to said leading edge, and at least one atomizer spaced along said airfoil lance for discharging slurry from the trailing edge.

2. A scrubber according to claim 1, including a hopper connected to a lower end of said housing and a waste outlet at the bottom of said hopper for discharging dried slurry solids/particulate which settles out of the gas.

3. A scrubber according to claim 1, including at least one solids/particulate diverting vane in the chamber between the waste gas inlet and at least one airfoil lance assembly for diverting the waste gas from the inlet into a direction substantially parallel to the airfoil from the large to the small diameter edges thereof.

* * * * *